United States Patent
Solomon et al.

(10) Patent No.: US 9,896,892 B2
(45) Date of Patent: Feb. 20, 2018

(54) SYSTEM AND METHOD FOR HANDLING DRILL PIPE USING A VACUUM HANDLER

(71) Applicant: Vacuworx Global, LLC, Tulsa, OK (US)

(72) Inventors: William Solomon, Tulsa, OK (US); Justin Hendricks, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 349 days.

(21) Appl. No.: 14/682,246

(22) Filed: Apr. 9, 2015

(65) Prior Publication Data

US 2015/0292277 A1 Oct. 15, 2015

Related U.S. Application Data

(60) Provisional application No. 61/978,437, filed on Apr. 11, 2014.

(51) Int. Cl.

| | |
|---|---|
| *E21B 19/14* | (2006.01) |
| *B25J 15/06* | (2006.01) |
| *B66C 1/02* | (2006.01) |
| *E21B 19/15* | (2006.01) |

(52) U.S. Cl.
CPC .......... *E21B 19/14* (2013.01); *B25J 15/0625* (2013.01); *B66C 1/02* (2013.01); *E21B 19/15* (2013.01); *E21B 19/155* (2013.01)

(58) Field of Classification Search
CPC ........ E21B 19/15; E21B 19/155; E21B 19/00; E21B 19/14; B66C 1/02; B25J 15/06–15/0691
USPC ......... 175/52, 85; 166/379; 414/22.51–22.71
See application file for complete search history.

(56) References Cited

U.S. PATENT DOCUMENTS

| | | | |
|---|---|---|---|
| 3,145,786 A | | 8/1964 | O'Neill et al. |
| 4,728,135 A | * | 3/1988 | Sugimura ............ B25J 15/0616 29/743 |
| 2008/0066964 A1 | * | 3/2008 | Hartke .................... E21B 19/14 175/52 |

FOREIGN PATENT DOCUMENTS

| | | |
|---|---|---|
| AU | 2012201885 A1 | 10/2012 |
| WO | 0073176 A2 | 12/2000 |

OTHER PUBLICATIONS

Mar. 2014 Website—UCT 2014—new-products-introduced-at-uc.pdf.*
Vacaworx, "HDD Pipe Handling System", Feb. 20, 2014, retrieved from internet on Oct. 29, 2015: URL:http://www.vacuworx.com/pdf/VacuworxDRillStem.pdf.

* cited by examiner

*Primary Examiner* — George S Gray
(74) *Attorney, Agent, or Firm* — GableGotwals

(57) ABSTRACT

A system and method for moving directional drill pipe with vacuum power. The system is used with a vacuum beam mounted on a boom. It has a vacuum pad that is pivotally attached at one end by a hinge to the vacuum beam. The other end of the vacuum pad is attached to the vacuum beam via a hydraulic cylinder. Operation of the hydraulic cylinder causes the vacuum pad to rotate about the hinge and change the angle of the vacuum pad relative to the vacuum beam. Lateral movement of the vacuum pad relative to the vacuum beam is provided by one or more pinned connections located adjacent to the hinge. Vacuum pressure from the vacuum pad is used to grasp and release drill pipe.

10 Claims, 2 Drawing Sheets

SYSTEM AND METHOD FOR HANDLING DRILL PIPE USING A VACUUM HANDLER

CROSS-REFERENCE TO PENDING APPLICATIONS

This application claims the benefit of U.S. Prov. Pat. Appl. No. 61/978,437 for A System and Method for Handling Drill Pipe Using a Vacuum Handler, filed Apr. 11, 2014.

FIELD OF THE INVENTION

The present invention relates generally to a vacuum handler for pipe. More particularly, the present invention relates to a vacuum handler for drill pipe.

BACKGROUND OF THE INVENTION

Directional drilling machines are typically used to install pipe under existing obstacles such as a river or road. During the operation, the directional drilling machine drills a hole that arches underneath the obstacle from the surface on one side of the obstacle to the surface on the other side of the obstacle. On the initial pass, the directional drilling machine drills the hole. Various methods are used to locate and guide the drill bit and drill string along the desired path. Lengths of drill pipe are added at the back end of the drill string as the drill bit progresses along its path. Once the drill bit reaches the surface on the other side of the obstacle the pipe that is to be installed is attached to the drill string and it is pulled into place as the drill string is retracted through the hole that was just drilled. If the diameter of the pipe is larger than the diameter of the initial hole, the diameter of the initial hole can be increased by reaming it out as the pipe and drill string are retracted back through the hole. As the drill string is retracted back through the hole the excess lengths of drill pipe are removed from the drill string.

Directional drilling requires handling of the drill pipe prior to being secured to the drill string and once it is removed from the drill string. In order to place the drill pipe into position it must be aligned with the end of the drill string. This requires the pipe to be at a slight angle to the ground, typically 1° to 30°. The drill pipe was previously handled in numerous ways using slings, chains, hoists, grappling claws and even moving by hand on smaller diameter pipe. Each of these methods has its own drawbacks ranging from operator safety to damage to the pipe resulting from mishandling.

What is needed, therefore, is an effective and safe way to handle the drill pipe that does not damage it.

BRIEF SUMMARY OF THE INVENTION

The present invention achieves its objectives by providing a system and method for moving directional drill pipe with vacuum power. The system is used with a vacuum beam mounted on a boom. It has a vacuum pad that is pivotally attached at one end by a hinge to the vacuum beam. The other end of the vacuum pad is attached to the vacuum beam via a hydraulic cylinder. Operation of the hydraulic cylinder causes the vacuum pad to rotate about the hinge and change the angle of the vacuum pad relative to the vacuum beam. Lateral movement of the vacuum pad relative to the vacuum beam is provided by one or more pinned connections located adjacent to the hinge. Vacuum pressure from the vacuum pad is used to grasp and release drill pipe.

The present invention provides a system and method to handle drill pipe for directional drilling which minimizes worker injuries and damage to drill pipe and equipment.

BRIEF DESCRIPTION OF THE DRAWINGS

Preferred embodiments of the invention have been described. Other features, aspects, and advantages of the present invention will become better understood with regard to the description, appended claims, and accompanying drawings (which are not to scale) where:

DETAILED DESCRIPTION OF THE INVENTION

Figure 1:
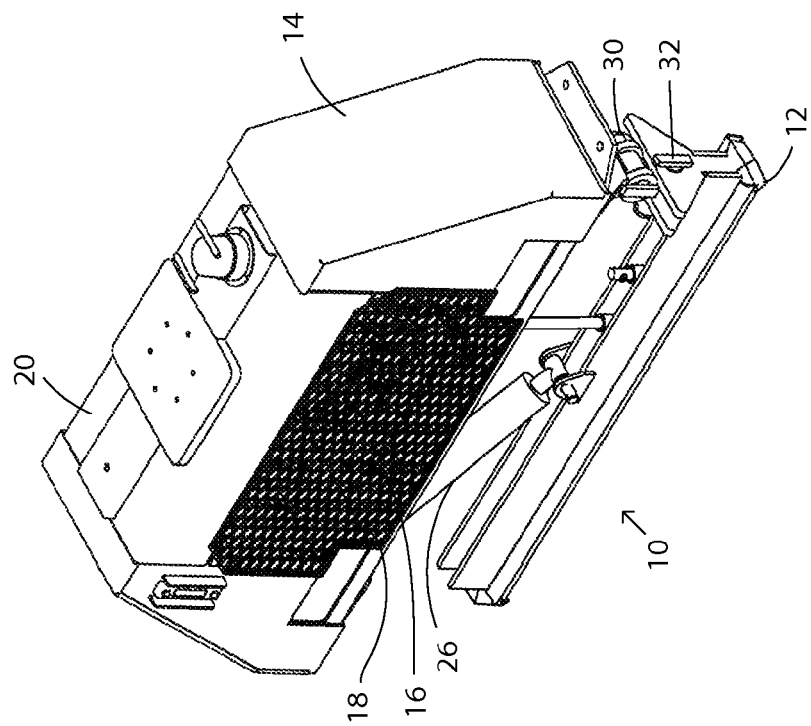
FIG. 1 is a perspective view of one embodiment of the present invention mounted to a vacuum beam.
Figure 5:
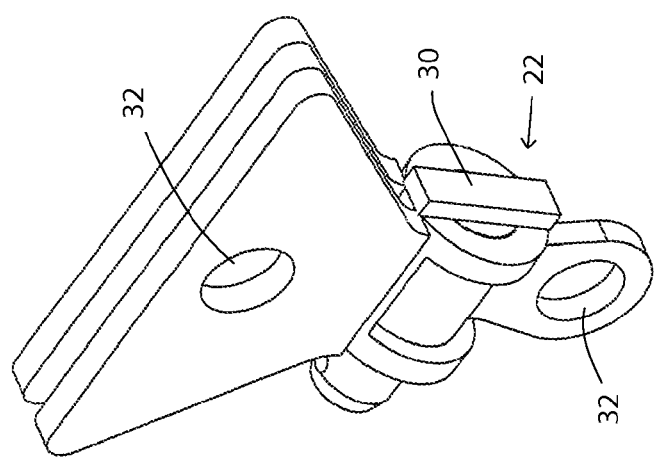
FIG. 5 is a perspective view of one embodiment of articulated link of the present invention.
Figure 4:
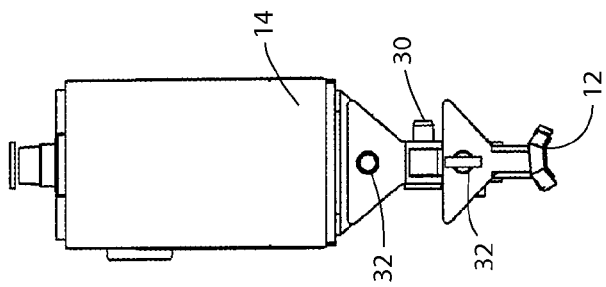
FIG. 4 is a right end view of FIG. 2.

The present invention provides safe and effective system 10 and method for handling drill pipe for a directional drilling machine using a vacuum pad 12 mounted on an excavator or other boom. The vacuum pad 12 is mounted to a vacuum beam 14 which is mounted to the boom of an excavator or other boom (not shown). The connection of the beam 14 to the excavator is typically accomplished with a rotator (not shown) capable of rotating the beam 14 relative to the boom.

Vacuum for the pad 12 is supplied by a vacuum pump 16 mounted on the beam 14. The vacuum pump 16 may be powered by an internal combustion engine 18 located on the beam 14. In the alternative, the vacuum pump 16 may be powered by a hydraulic pump which in turn is powered by hydraulic fluid from the excavator.

The beam 14 also contains a vacuum reservoir 20 which is in fluid communication with the vacuum pump 16 and the vacuum pad 12. This provides additional time for the operator to react to an event where operation of the vacuum pump 16 is interrupted.

Figure 2:
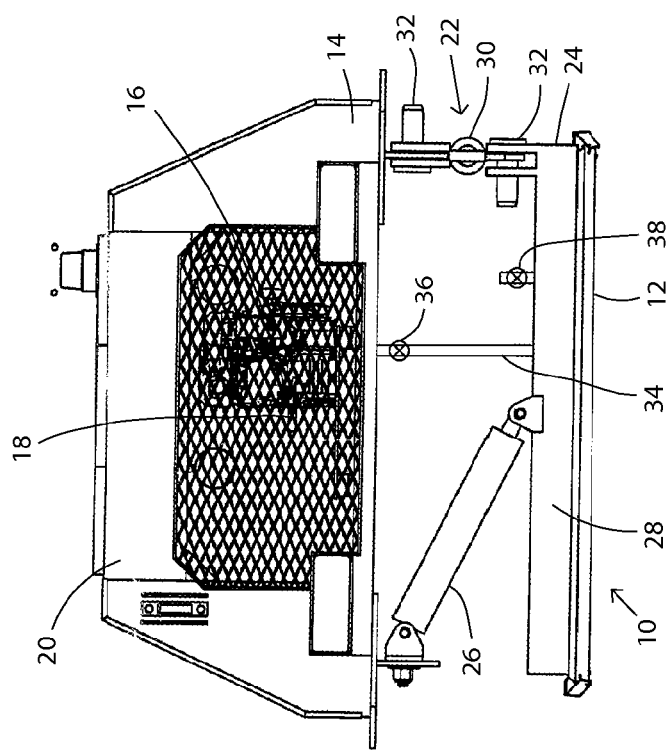
FIG. 2 is a side view of one embodiment of the present invention mounted to a vacuum beam.
Figure 3:
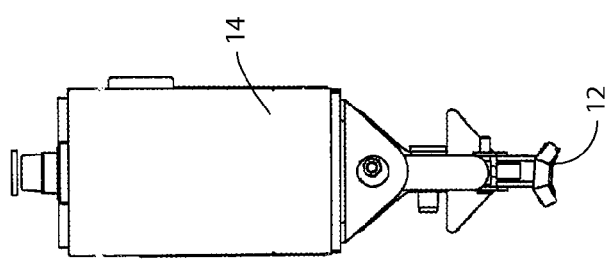
FIG. 3 is a left end view of FIG. 2.

The vacuum pad 12 is attached to beam 14 by harness 22 that is articulated at a first half 24 and has a hydraulic cylinder 26 on the second half 28. The angle of the pad 12 (and any pipe it may be carrying) relative to the beam 14 can be adjusted by operation of the hydraulic cylinder 26. As can be seen in FIGS. 1 and 2, the hydraulic cylinder 26 does not need to be located on the very end of the second half 28 of the pad 16 as shown in FIGS. 1 and 2. Likewise the pinned connection 32 may not be on the very end the pad 12. The exact location of where the hydraulic cylinder 26 and pinned connection 32 is mounted to the pad 12 is a function of the size of the hydraulic cylinder 26 and the amount of load anticipated on the pad 12.

Operation of the hydraulic cylinder 26 causes the vacuum pad 12 to pivot about a hinge 30. Thus the angle of the vacuum pad 12 relative to the vacuum beam 14 can be adjusted.

Slight lateral angle adjustments can be accommodated by one or more pinned connections 32 or other articulations in the harness 22. In the preferred embodiment, these one or more pinned connections are perpendicular with the hinge 30. This assures the pad 12 can be aligned with the pipe being picked up. In the preferred embodiment, this lateral angle adjustment is not actively controlled. Rather it reacts to movement of the pad 12 and beam 14 relative to the pipe being picked up.

A vacuum line 34 connects the pad 12 to the vacuum pump 16 and vacuum reservoir 20. Thus all three of these elements are in fluid communication with one another. A first solenoid operated valve 36 provides a way to isolate the vacuum pad 16 from the vacuum pump 16 and vacuum reservoir 20. A second solenoid operated valve 38 is capable of opening the vacuum pad 16 to atmosphere. This releases the vacuum pressure between the vacuum pad and the drill pipe.

In operation, the drill pipe is typically stored in a horizontal orientation. The excavator operator lowers the vacuum beam 14 and vacuum pad 12 over the drill pipe. Using the rotator the vacuum pad 12 is rotated to align it with the drill pipe. The vacuum pad 12 is then brought into contact with the drill pipe. A vacuum seal is created between the vacuum pad 12 and the drill pipe. This is accomplished by opening the first solenoid operated valve 36 which brings the vacuum pump 16 and/or vacuum reservoir 20 into fluid communication with the vacuum pad 12. Once the drill pipe is secured to the vacuum pad 12 by the vacuum pressure, the vacuum beam 14, vacuum pad 12 and drill pipe are lifted and moved into position with the directional drilling machine through movement of the boom and rotator. The angle of the drill pipe relative to the vacuum beam 14 and ground is then adjusted by extending the hydraulic cylinder 26. This causes the vacuum pad 12 and pipe to rotate about the hinge 30.

Once the directional drilling machine secures the pipe, the pipe is released from the vacuum pad 12. This is accomplished by closing the first solenoid operated valve 36 between the pad 12 and the vacuum pump 16 and vacuum reservoir 20. A second solenoid operated valve 38 on the vacuum pad 12 is then opened to atmosphere. This terminates the vacuum between the vacuum pad 12 and the pipe.

Retrieving a pipe from the directional drilling machine and moving it to storage is accomplished in the reverse order of events.

Articulation and movement of the pad 12 relative to the beam 14 could be accomplished by other means and still be within the scope of this invention. Further the location of power and vacuum sources could be rearranged and still be within the scope of this invention.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A system for handling drill pipe for a directional drilling machine mountable on a boom, the system comprising:
    a vacuum beam;
    a vacuum pad having a first portion and a second portion;
    a vacuum line connecting the vacuum pad to a vacuum pump and a vacuum reservoir and placing them in fluid communication with one another; and
    a harness including a hinge attaching the first portion of the vacuum pad to the vacuum beam wherein the harness is capable of varying the angle of the pad relative to the vacuum beam;
    a hydraulic cylinder attaching the second portion of the vacuum pad to the vacuum beam;
    wherein operation of the hydraulic cylinder rotates the vacuum pad about the hinge and relative to the hydraulic cylinder.

2. The system of claim 1 said harness further comprising:
    one or more pinned connections;
    wherein the pinned connections provide lateral movement of the pad relative to the vacuum beam.

3. The system of claim 2 said harness further comprising:
    a plane of rotation of the one or more pinned connections being oriented perpendicular to a plane of rotation of the hinge.

4. The system of claim 3 further comprising:
    a first solenoid operated valve capable of isolating the vacuum pad from the vacuum pump and vacuum reservoir; and
    a second solenoid operated valve capable of opening the vacuum pad to atmosphere.

5. The system of claim 1 further comprising:
    the vacuum pump and vacuum reservoir being mounted on the vacuum beam.

6. A system for handling drill pipe for a directional drilling machine mountable on a boom, the system comprising:
    a vacuum beam having a vacuum pump and a vacuum reservoir;
    a vacuum pad having a a first portion and a second portion;
    a vacuum line connecting the vacuum pad to the vacuum pump and vacuum reservoir and placing them in fluid communication with one another;
    a first solenoid operated valve capable of isolating the vacuum pad from the vacuum pump and vacuum reservoir;
    a second solenoid operated valve capable of opening the vacuum pad to atmosphere; and
    a harness having a hinge and one or more pinned connections attaching the vacuum beam and the first portion of the vacuum pad, a hydraulic cylinder attaching the vacuum beam to the second portion of the vacuum pad;
    wherein a plane of rotation of the hinge is oriented to be perpendicular to a plane of rotation of the one or more pinned connections and operation of the hydraulic cylinder rotates the pad about the hinge and relative to the hydraulic cylinder.

7. A method for moving drill pipe for a directional drilling machine, the method comprising the steps of:
    providing a vacuum beam mounted on a boom, the vacuum beam having a hinge connecting the vacuum beam to a first portion of the vacuum pad and a hydraulic cylinder connecting the vacuum beam to a second portion of the vacuum pad;
    lowering the vacuum beam and a vacuum pad over a drill pipe;
    aligning the pad with the drill pipe;
    creating a vacuum between the vacuum pad and the drill pipe;
    lifting the vacuum beam, vacuum pad and drill pipe;
    lowering the vacuum beam, vacuum pad and drill pipe adjacent to the directional drilling machine;
    aligning the drill pipe with the directional drilling machine by operating the hydraulic cylinder and rotating the vacuum pad and drill pipe about a hinge and relative to the vacuum beam; and after the drill pipe is secured to the directional drilling machine, releasing the drill pipe from the vacuum pad by breaking the vacuum.

8. The method of claim 7, the step of creating a vacuum between the vacuum pad and the drill pipe comprising the steps of:

opening a first solenoid operated valve located between the vacuum pad and a vacuum pump; and closing a second solenoid operated valve located between atmosphere and the vacuum pad.

9. The method of claim 7, the step of releasing the drill pipe from the vacuum pad by breaking the vacuum, comprising the steps of:

closing a first solenoid operated valve located between the vacuum pad and a vacuum pump; and opening a second solenoid operated valve located between atmosphere and the vacuum pad.

10. The method of claim 7 further comprising the steps of:

lowering the vacuum beam and vacuum pad over the drill pipe in the directional drilling machine;

aligning the pad with the drill pipe by operating the hydraulic cylinder and rotating the vacuum pad and drill pipe about a hinge and relative to the vacuum beam;

creating a vacuum between the vacuum pad and the drill pipe;

releasing the drill pipe from the directional drilling machine;

lifting the vacuum beam, vacuum pad and drill pipe;

aligning the drill pipe to a horizontal position by operating the hydraulic cylinder and rotating the vacuum pad and drill pipe about a hinge and relative to the vacuum beam;

lowering the vacuum beam, vacuum pad and drill pipe over a desired location; and releasing the drill pipe from the vacuum pad by breaking the vacuum.

\* \* \* \* \*